(No Model.)
J. McLANDSBOROUGH.
POST DRIVER.
No. 485,051. Patented Oct. 25, 1892.
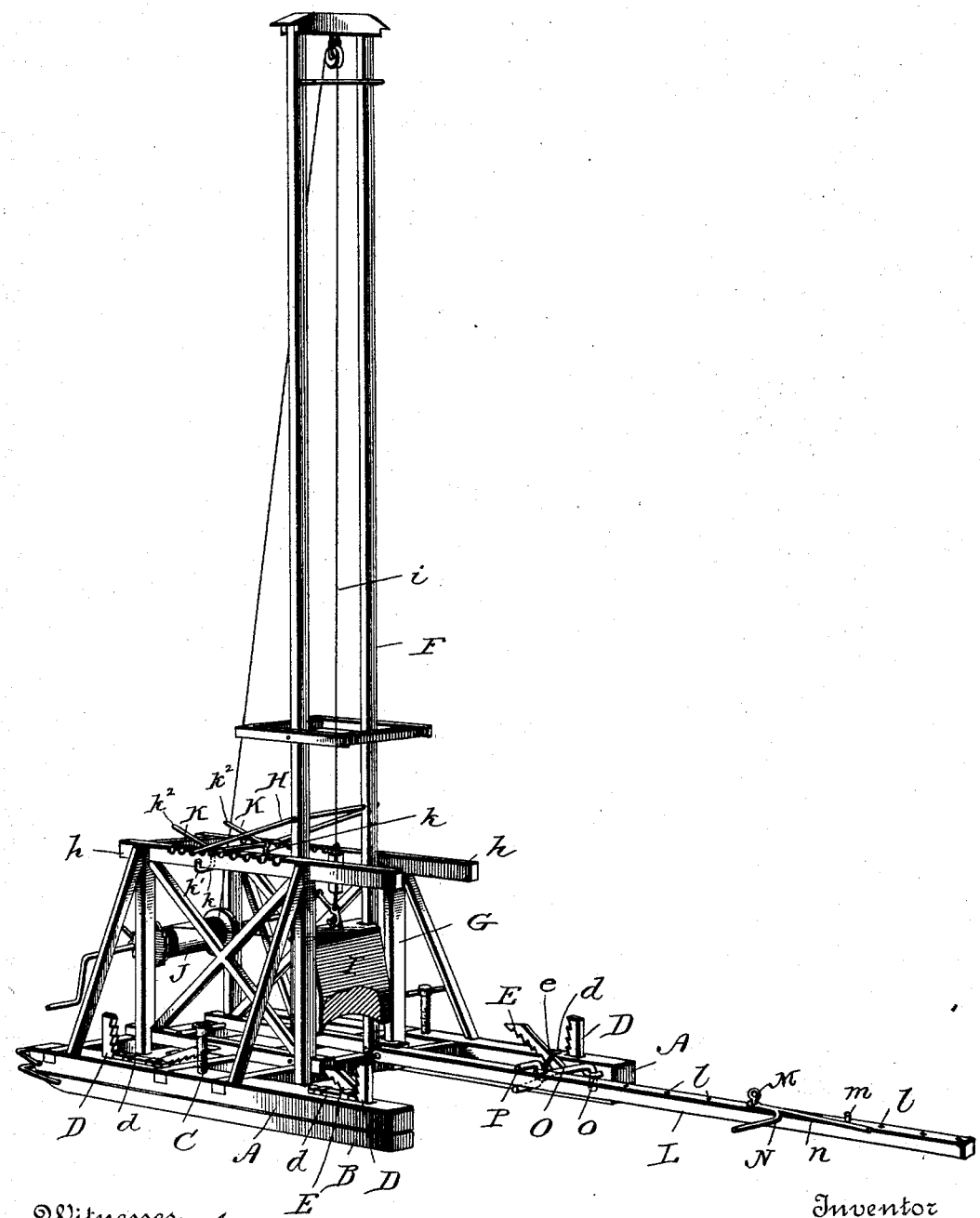
Witnesses
Inventor
Joseph McLandsborough.
By his Attorneys

UNITED STATES PATENT OFFICE.

JOSEPH McLANDSBOROUGH, OF STATION FIFTEEN, OHIO.

POST-DRIVER.

SPECIFICATION forming part of Letters Patent No. 485,051, dated October 25, 1892.

Application filed May 12, 1892. Serial No. 432,771. (No model.)

*To all whom it may concern:*

Be it known that I, JOSEPH McLANDSBOROUGH, a citizen of the United States, residing at Station Fifteen, in the county of Harrison and State of Ohio, have invented certain new and useful Improvements in Post-Drivers; and I do hereby declare the following to be a full, clear, and exact description of the invention, such as will enable others skilled in the art to which it appertains to make and use the same.

This invention relates to machines for driving posts, and especially to that class which is designed to drive the posts in the construction of a line of fencing.

The purpose of the present invention is to combine with machines of the aforesaid class a guide and measure for purposes of giving direction to the machine and properly spacing the posts.

The improvement consists of the novel features and the peculiar construction and combination of the parts, which will be hereinafter more fully described and claimed, and shown in the accompanying drawing, which is a perspective view of a machine embodying my invention, the lower portion of the driver being broken away to show the concave driving-face.

The machine in its general construction is substantially the same as that shown and described in my patent, No. 448,140, and dated March 10, 1891, and comprises the base A, which is mounted on the runners B, and adjusted vertically by means of the set-screws C and which is held in the adjusted position by the vertical ratchet-bars D and the catches $d$ and the oblique ratchet-bars E and the stops $e$, which are adapted to be engaged by the said ratchet-bars E. The driver-guide F, pivoted at its lower end to the base A and working between the side pieces of the vertical frame G, is held in the located position by the bail H, engaging with corresponding notches in the parallel side bars $h$. The driver I is elevated by the rope $i$, which passes around the windlass J, which is suitably mounted in the vertical frame G. The catches K, two in number, for holding the bail H to the side bars $h$ are mounted on the horizontal portion of the said bail and have one end $k$ bent so as to project beneath the side bar $h$, and its outer end $k'$ bent at right angles, so as to embrace the sides of the bar $h$ and hold the catch in the adjusted position. The opposite end $k^2$ of the catch K forms a handle which is designed to be grasped when operating the said catch to secure or release the bail.

The guide L is a rod and is pivotally connected with the machine and projects in the rear thereof a sufficient distance to effect the desired result. This guide is graduated, so as to properly space the posts at the required distance apart and is provided on its upper side with a series of openings $l$, which are designed to receive a pin M and a stop $m$. A hook N, having a long shank $n$, is connected with the guide L by means of the pin M and is braced laterally by means of the stop $m$, which engages with the shank $n$. A brace-hook O has its inner end inserted in a staple or keeper $o$ in a side beam of the base and has its outer end constructed to embrace the upper and lower sides of the guide L, so as to hold the same off the ground and in the desired position. The bifurcated portion P at the outer end of the hook O is horseshoe-shaped and held at its closed end in an eye provided at the outer end of the said hook O.

The driver I is provided with a concave driving-face, which in practice prevents the splitting of the posts by forcing the outer fibers thereof toward the center, as will be readily understood.

In practice the hook N is adjusted on the guide L so that the distance between the said hook and the driver I will represent the space between the posts. After the first post has been driven the machine is moved forward along the prescribed line of fence until the hook N engages with the said post, when the machine is in the proper position to drive the next post, thereby obviating the making of measurement. This operation is repeated until all the posts are driven. It will be observed that the hook N forms in effect a means for anchoring the machine when the same has arrived at a position to properly drive the posts.

Having thus described my invention, what I claim, and desire to secure by Letters Patent, is—

1. The combination, with a machine for driving posts, of a graduated guide projected therefrom and having a series of openings, a hook having a shank, a pin for connecting the hook with the guide, and a stop to brace the shank of the hook, substantially as described.

2. The combination, with a machine for driving posts and a guide projected therefrom and having a hook to anchor the machine and properly space the posts, of a brace-hook between a side beam of the machine-base and having its outer end constructed to embrace the said guide, substantially as described, for the purpose set forth.

In testimony whereof I affix my signature in presence of two witnesses.

JOSEPH McLANDSBOROUGH.

Witnesses:
GEO. HECKLER,
W. G. HERRON.